United States Patent [19]

Zwirn

[11] Patent Number: 4,991,020
[45] Date of Patent: Feb. 5, 1991

[54] IMAGING SYSTEM FOR PROVIDING SEPARATE SIMULTANEOUS REAL TIME IMAGES FROM A SINGEL IMAGE SENSOR

[75] Inventor: Robert Zwirn, Los Angeles, Calif.
[73] Assignee: Hughes Aircraft Company, Los Angeles, Calif.
[21] Appl. No.: 311,785
[22] Filed: Feb. 17, 1989
[51] Int. Cl.⁵ .......................... H04N 5/00; H04N 5/33
[52] U.S. Cl. .................................... 358/160; 358/166; 358/113; 358/180; 250/334
[58] Field of Search .................. 358/93, 101, 108, 109, 358/125, 126, 49, 113, 160, 183, 22; 250/330, 334

[56] References Cited
U.S. PATENT DOCUMENTS

| | | | |
|---|---|---|---|
| 4,517,599 | 5/1985 | Zwirn et al. | 358/166 |
| 4,574,197 | 3/1986 | Kliever | 358/113 X |
| 4,722,007 | 1/1988 | Fling | 358/180 |
| 4,751,571 | 6/1988 | Lillquist | 358/113 |
| 4,774,581 | 9/1988 | Shiratsuchi | 358/180 |
| 4,786,966 | 11/1988 | Hanson et al. | 358/108 |
| 4,843,483 | 6/1989 | Bogner | 358/22 |

Primary Examiner—James J. Groody
Assistant Examiner—Mark R. Powell
Attorney, Agent, or Firm—William J. Streeter; Wanda K. Denson-Low

[57] ABSTRACT

A system is disclosed for providing separate simultaneous real time images from a single image sensor. The invention 10 is adapted for use with an image sensor 12 which provides a first set of electrical signals in response to electromagnetic energy received thereby from a scene and includes a processor 16 for processing the first set of electrical signals to provide a second set of electrical signals and at least one display 14 for providing first and second separate simultaneous real time images in response to the first and second sets of electrical signals respectively. In a preferred embodiment, the processor 16 includes circuitry for increasing the sampling rate of the image sensor 12 and a deconvolver 30 for processing the highly sampled signals to generate a second set of electrical signals which, when displayed contemporaneously with said first electrical signals, provide an enhanced magnified portion of the sensed scene.

12 Claims, 3 Drawing Sheets

IMAGING SYSTEM FOR PROVIDING SEPARATE SIMULTANEOUS REAL TIME IMAGES FROM A SINGEL IMAGE SENSOR

BACKGROUND OF THE INVENTION

1. Field of the Invention

The present invention relates to imaging systems. More specifically, the present invention relates to systems for providing multiple infrared images.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

In many applications, there is a need to provide multiple simultaneous real time images from a single sensor. In forward looking infrared (FLIR) systems, for example, many situations arise in which simultaneous wide angle and zoom views of a scene would be desirable. Previous known attempts to provide such capability have involved two or more sets of lenses and associated optical equipment, one for each field-of-view desired. Typified by boresighted optical fields-of-view, these systems often include an optical field-of-view which would be activated whenever the operator desired the alternate view. Unfortunately, there are several limitations associated with the simple provision of multiple optical arrangements to provide multiple fields-of-view of an object in real time.

Multiple optical arrangements can add significantly to the cost, size and weight of an imaging system. (This is particularly problematic with respect to FLIR systems which are generally expensive.) These systems are generally mechanically complex and have close manufacturing tolerances which require precision assembly and maintenance. Further, multiple optical arrangements generally increase the weight on the gimbal supporting the sensor and thereby limit the performance of the host system.

In addition, to the extent that systems equipped with such multiple optical arrangements provide multiple images of a scene, the zoomed image is generally confined to the center of the wide angle field-of-view. This common boresight limitation prevents a second operator from zooming in on a portion of the image outside of the boresight of the wide angle lens.

A particularly significant limitation of the multiple optical arrangement approach is that these systems do not provide simultaneous images per se. That is, as only one set of optics may be selected at a time, only one view is available at a time. This is an obvious limitation in situations in which it is desirable to provide a field-of-view for more than one operator at a time. With respect to military equipment, for example, it may be desirable to provide a driver with a wide angle field-of-view and a gunner with a simultaneous zoom view of a particular portion of a scene from the same image sensor.

An additional limitation of the multiple optical arrangement approach is that the magnification of the lenses is fixed and discretely limited. Only one magnification is available at a time.

Finally, there are many systems in the field for which this capability would be desirable. Yet the retrofit of existing systems to provide this limited conventional capability would be too expensive to provide a practical option.

Thus, there is a need in the art for an inexpensive nonmechanical system or technique for providing multiple simultaneous real time images providing diverse fields-of-view of a scene with diverse variable degrees of magnification and without mutual boresight interdependence. Ideally, the system would allow for a ready (noninvasive) retrofit into existing systems and would not degrade the performance thereof.

SUMMARY OF THE INVENTION

The need in the art is addressed by the system of the present invention which provides two separate simultaneous real time images from a single image sensor. The invention is adapted for use with an image sensor which provides a first set of electrical signals in response to electromagnetic energy received thereby from a scene and includes a processor for processing the first set of electrical signals to provide a second set of electrical signals and two displays for providing first and second separate simultaneous real time images in response to the first and second sets of electrical signals respectively.

In a preferred embodiment, the processor includes circuitry for increasing the spatial sampling rate of the image sensor and a deconvolver for processing the highly sampled signals to generate a second set of electrical signals which when displayed contemporaneously with said first electrical signals, provide an enhanced magnified portion of the sensed scene.

DESCRIPTION OF THE INVENTION

Figure 1:
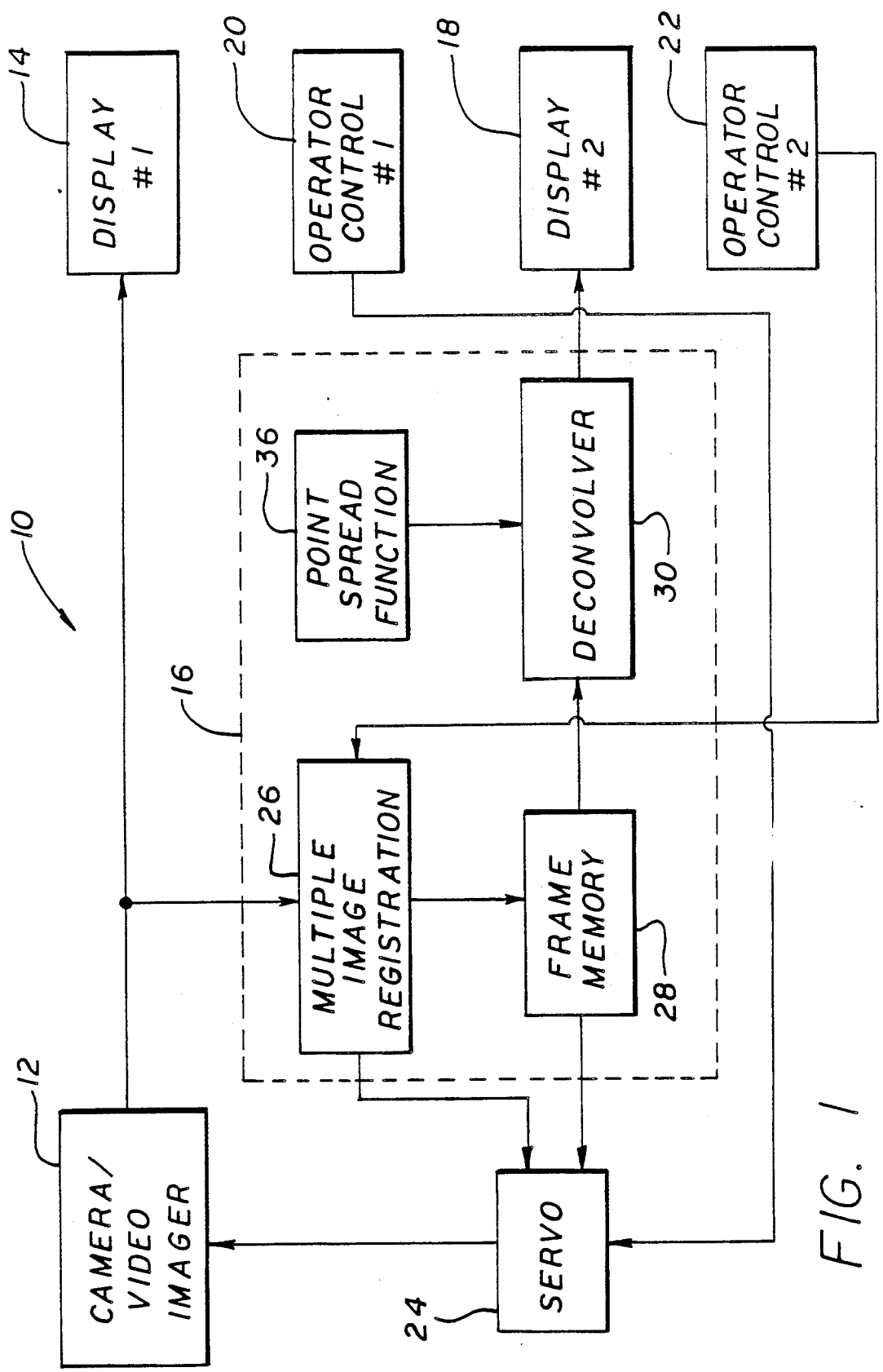
FIG. 1 a block diagram of an illustrative embodiment the imaging system of the present invention.

FIG. 1 shows a block diagram of an illustrative embodiment of the imaging system 10 of the present invention. The system 10 includes a conventional camera or video imager 12 which provides a first set of electrical output signals representative of electromagnetic energy received thereby from a scene within the field-of-view thereof. Any type of camera or video imager may be used. In the preferred embodiment, the camera or video imager 12 is a nonintegrating type imager such as a forward looking infrared (FLIR) sensor.

In the illustrative embodiment of FIG. 1, the output of the camera 12 is provided to a first display 14 and to an image processor 16. The first display 14 displays a first image in response to the first electrical signals provided by the camera 12. As discussed more fully below, the image processor 16 generates a second set of electrical signals representative of a second image which, in the preferred embodiment, is enhanced to provide a sharp, high resolution, magnified view of a portion of the first image. The output of the processor 16 is provided to a second display 18. Hence, the second display 18 displays the second image in response to the second set of electrical signals from the processor 16.

The invention contemplates the use of first and second operator controls 20 and 22 by first and second operators viewing the first and second displays 14 and 18 respectively. The field-of-view of the camera 12, as shown in the first display 14, is determined by the first control 20 which controls the pointing angle of the camera 12 through a conventional servo 24. In accordance with the principles of the present invention, the field-of-view of the second display is selected by the second control 22 through the image processor 16 which in turn controls the servo 24.

In the preferred embodiment, the image processor 16 increases the sampling rate of the camera 12 above the Nyquist criterion and deconvolves the highly sampled signals to provide the second set of electrical signals corresponding to the sharp, high resolution, magnified view of a portion of the first image without restriction by the boresight of the camera 12 to the center of the first image. U.S. Pat. No. 4,517,599, issued to Zwirn et al. on May 14, 1985, (the teaching of which is incorporated herein by reference) discloses a technique for processing the output of the camera 12 to provide such an enhanced image. The increased sampling of the scene is provided by a multiple image registration circuit 26 which produces a multiple-registered video frame consisting of a plurality of subpixels of reduced area from a plurality of normal video frames provided by the camera 12. The image motion or camera jitter between subsequent normal video frames determines the subpixel displacement in the multiple-registered video frame. In effect, the multiple image registration circuit forms a mosaic of displaced ones of successive video frames generated by the camera 12. Implementation of multiple-image registration in already existing system hardware may be accomplished using a correlation tracker, or image motion compensating servo error or camera platform stabilizing gyro error. The multiple image registration circuit typically includes provision for adjusting the address into which correspondingly displaced pixel data are placed. It will be appreciated by those skilled in the art that other techniques may be used to increase the sampling rate of the camera including the use of smaller detectors to achieve dense sampling in a single frame.

Figure 2A:
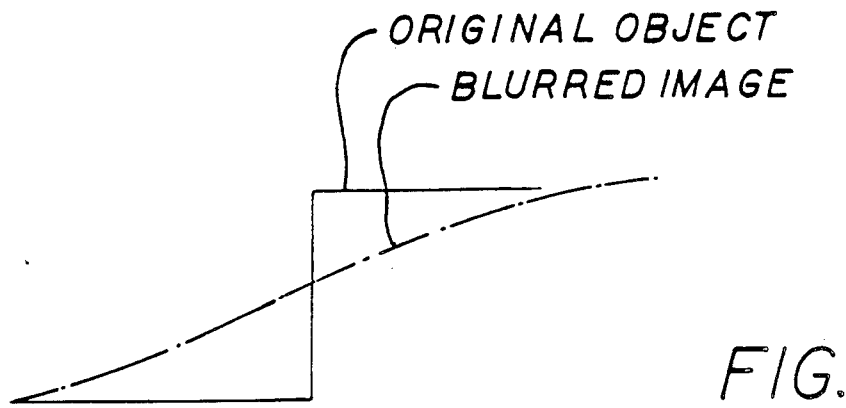
FIG. 2(a) shows the intensity, as a function of position across the image plane of the camera utilized in the present invention, of an original image, a blurred image and a reblurred image.

The multiple image registration circuit 26 is connected to the servo 24 and a frame memory 28. The frame memory 28 stores the multiple-registered video frames produced by the multiple image registration circuit 26 for access by a deconvolver 30. The deconvolver 30 convolves each multiple-registered video frame with signals, stored in a second memory 36, which represent the inverse of the intrinsic point spread function of the aperture of the camera 12. This is illustrated in FIG. 2(a) which shows the intensity, as a function of position across the image plane of the camera 12, of an original object (solid line) having a sharp edge therein and a blurred image (dashed line) distorted from the original object by the point spread function of the camera 12.

Figure 2B:
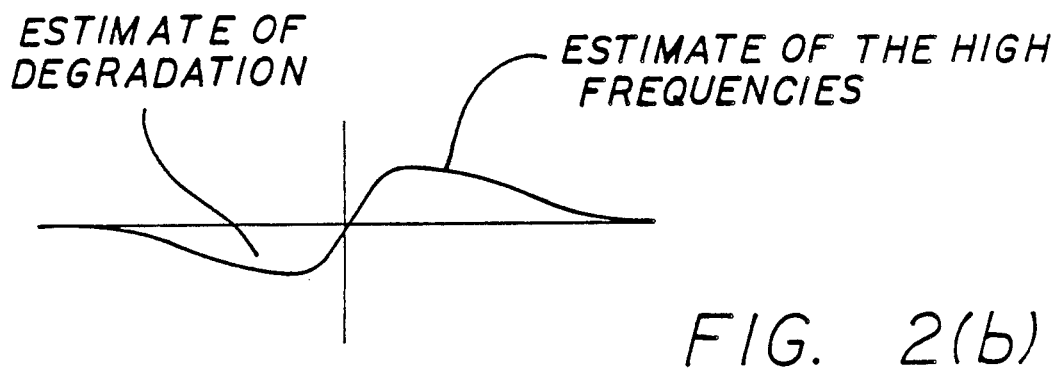
FIG. 2(b) depicts the high frequencies that will be restored by the convolution process of the present invention.
Figure 2C:
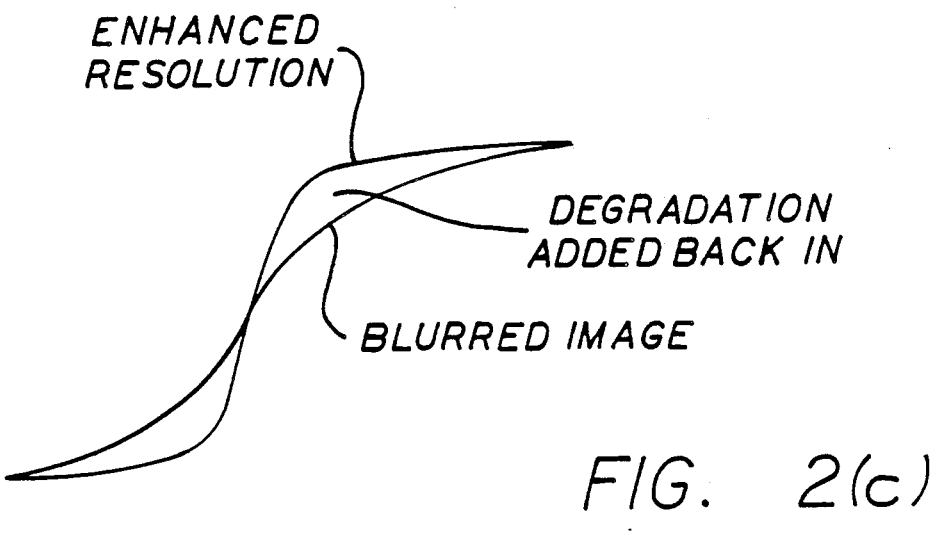
FIG. 2(c) shows an enhanced (blur suppressed) image resulting from the deconvolution process employed in the preferred embodiment of the present invention.

FIG. 2(b) depicts the high frequencies which will be restored by the convolution process. The result is the enhanced (unblurred) image illustrated in FIG. 2(c) and fed to the second display 18.

Figure 3:
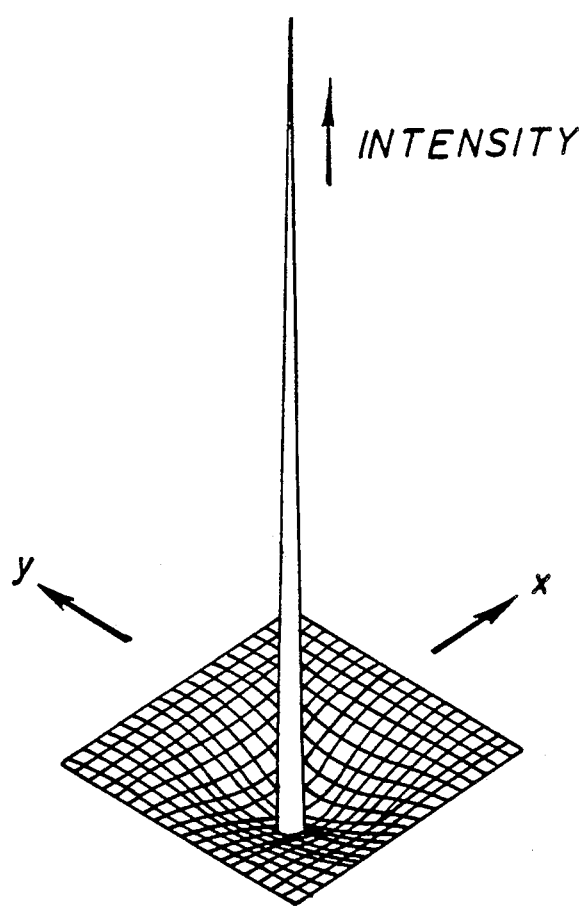
FIG. 3 is a graphic perspective view of a surface corresponding to the convolution mask used by the image processor of the imaging system of the present invention.

The deconvolver 30 effectively utilizes a convolution mask of the form shown in FIG. 3 in which the x axis represents the position along a first direction across the image plane of the camera 12 and the y axis represents the position along a second direction, normal to the first direction, across the image plane of the camera 12. The z axis represents intensity. (As described in the above-identified reference incorporated herein by reference, the mask comprises the negative of the sensor degradation and a positive impulse function on the center pixel of weight 2, the aggregate weight of the entire mask being equivalent to unity.)

The enhancement of the original image provided by the image processor 16 allows for a selected portion of the first image to be magnified with minimal blur. The portion of the first image to be magnified and displayed in the second display 18 is selected by the second operator control 22. That is, the second control 22 identifies which subset of the image displayed in display 14 is to be stored in the frame memory 28 and displayed in the second display 18. When the second operator seeks to view a portion of the scene not within the field-of-view of the camera 12, the servo 24 is activated through the multiple image registration circuit 26 to include the object of interest in the cameras field-of-view.

Figure 4A:
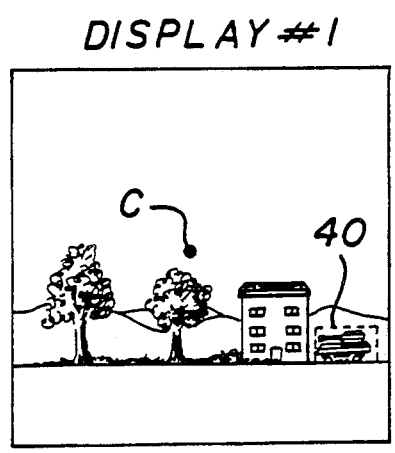
FIGS. 4(a) and 4(b) illustrate the images generated in the first and second displays respectively by the image processor utilized in the image system of the present invention.
Figure 4B:
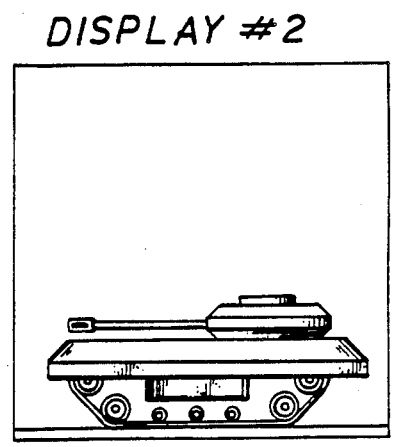

FIGS. 4(a) and 4(b) illustrate the images generated in the first and second displays 14 and 18 by the image processor 16 of the present invention. The second image is magnified view of a portion of the first image within the window 40 thereof. Note that the second image is not limited to a field-of-view centered near the center "C" of the first image.

Thus, the present invention has been described herein with reference to a particular embodiment for a particular application. Those having ordinary skill in the art and access to the present teachings will recognize additional modifications applications and embodiments within the scope thereof. For example, the invention is not limited to the type of camera or the type of display used therewith. Further, the invention is not limited to any particular technique for enhancing the second image. Finally, the invention is not limited to two displays. Any number of displays and corresponding image processors may utilized as necessary for a particular application.

It is therefore intended by the appended claims to cover any and all such applications, modifications and embodiments within the scope of the present invention.

Accordingly,

What is claimed is:

1. An imaging system for providing separate simultaneous real time images from a single image sensor, said imaging system comprising:
   means for providing a first set of electrical signals in response to electromagnetic energy received thereby from a scene;
   first display means directly connected electrically to said sensor for displaying a first image representative of said first set of electrical signals;

processing means for processing said first set of electrical signals to provide a second set of electrical signals and second display means for displaying a second image representative of said second set of electrical signals.

2. The invention of claim 1 wherein said processing means includes means for enhancing said second image.

3. The invention of claim 2 wherein said means for enhancing said image includes means for effectively increasing a sampling rate of said image sensor.

4. The invention of claim 3 wherein said means for effectively increasing a sampling rate of said image sensor includes multiple image registration means for forming a mosaic of displaced ones of successive video frames generated by said image sensor.

5. The invention of claim 4 wherein said means for effectively increasing a sampling rate of said image sensor includes frame memory means for storing said successive video frames of generated by said sensor means.

6. The invention of claim 3 wherein said processing means includes deconvolving means for deconvolving said increase sample rate frames of first electrical signals stored in said frame memory means.

7. The invention of claim 6 wherein said deconvolving means includes means for convolving said first set of increased sample rate electrical signals with the inverse or the point spread function associated with the degradations of said image sensor to provide a set of convolved signals.

8. The invention of claim 7 wherein said deconvolving means includes means for enhancing said first set of increased sample rate electrical signals to provide said second set of electrical signals and said second set of electrical signals represent said enhanced second image.

9. An imaging system for providing separate simultaneous real time images from a single image sensor comprising:

sensor means for providing a first set of electrical signals in response to electromagnetic energy received thereby from a scene;

means for providing a first set of electrical signals in response to electromagnetic energy received thereby from a scene;

first display means directly connected electrically to said sensor for displaying a first image representative of said first set of electrical signals;

processing means for processing said first set of electrical signals to provide a second set of electrical signals, said processing means including means for enhancing said second image including:

means for effectively increasing a sampling rate of said sensor means, means for convolving said first set of increased sample rate electrical signals with the inverse of the point spread function associated with the degradations of said sensor means to provide a set of convolved signals; and second display means for displaying a second image representative of said second set of electrical signals.

10. The invention of claim 9 wherein said means for effectively increasing a sampling rate of said sensor means includes multiple image registration means for forming a mosaic of displaced ones of successive video frames generated by said sensor means.

11. The invention of claim 10 wherein said means for effectively increasing a sampling rate of said sensor means includes frame memory means for storing said successive video frames generated by said sensor means.

12. A method for providing separate simultaneous real time images from a single image sensor including the steps of:

providing a first set of electrical signals in response to electromagnetic energy received thereby from a scene;

displaying in a first display, directly connected electrically to said sensor, a first image representative of said first set of electrical signals;

processing said first set of electrical signals to provide a second set of electrical signals and displaying in a second display a second image representative of said second set of electrical signals.

* * * * *

UNITED STATES PATENT AND TRADEMARK OFFICE
CERTIFICATE OF CORRECTION

PATENT NO. : 4,991,020
DATED : February 5, 1991
INVENTOR(S) : ROBERT ZWIRN

It is certified that error appears in the above-identified patent and that said Letters Patent is hereby corrected as shown below:

On the title page item [54], third line, delete "SINGEL" and substitute therefor --SINGLE--.

Column 1, line 3, delete "SINGEL" and substitute therefor --SINGLE--.

Signed and Sealed this

Fifth Day of January, 1993

Attest:

DOUGLAS B. COMER

*Attesting Officer*  *Acting Commissioner of Patents and Trademarks*